United States Patent
Huisjes et al.

(10) Patent No.: US 7,425,273 B2
(45) Date of Patent: Sep. 16, 2008

(54) METHOD AND APPARATUS FOR PROCESSING A SUSPENSION

(75) Inventors: Piet Huisjes, Nijverdal (NL); Johannes van der Meer, Loenen aan de Vecht (NL); Michiel Nienoord, Apeldoorn (NL); Dirk Verdoes, Apeldoorn (NL)

(73) Assignee: Nederlandse Organisatie voor toegepast-natuurwetenschappelijk Onderzoek TNO, VK Delft (NL)

( * ) Notice: Subject to any disclaimer, the term of this patent is extended or adjusted under 35 U.S.C. 154(b) by 458 days.

(21) Appl. No.: 10/503,098

(22) PCT Filed: Jan. 30, 2003

(86) PCT No.: PCT/NL03/00068

§ 371 (c)(1),
(2), (4) Date: Feb. 1, 2005

(87) PCT Pub. No.: WO03/063997

PCT Pub. Date: Aug. 7, 2003

(65) Prior Publication Data

US 2005/0115363 A1  Jun. 2, 2005

(30) Foreign Application Priority Data

Jan. 30, 2002   (NL) .................................. 1019862

(51) Int. Cl.
*B01D 24/30*   (2006.01)
*B01D 33/48*   (2006.01)
*C22B 9/02*    (2006.01)

(52) U.S. Cl. ........................ 210/780; 75/407
(58) Field of Classification Search ............. 75/678, 75/407; 210/780
See application file for complete search history.

(56) References Cited

U.S. PATENT DOCUMENTS

| 3,212,282 | A | * | 10/1965 | Stoller | 62/540 |
| 3,232,069 | A | * | 2/1966 | Hawkins | 62/540 |
| 3,628,341 | A | * | 12/1971 | Klotz et al. | 62/539 |
| 4,332,599 | A | * | 6/1982 | Thijssen et al. | 62/542 |
| 6,224,648 | B1 | * | 5/2001 | Verdoes et al. | 75/407 |
| 6,495,044 | B1 | * | 12/2002 | Verdoes | 210/634 |
| 6,780,206 | B2 | * | 8/2004 | Nordhoff et al. | 23/295 R |

FOREIGN PATENT DOCUMENTS

| WO | 98/27240 | | 6/1998 |
| WO | WO 98/27240 | * | 6/1998 |

OTHER PUBLICATIONS

International Search Report for PCT/NL03/00068, mailing date May 6, 2003.*

* cited by examiner

*Primary Examiner*—Roy King
*Assistant Examiner*—Tima M McGurthy-Banks
(74) *Attorney, Agent, or Firm*—Young & Thompson

(57) ABSTRACT

The invention relates to a method and apparatus for processing a suspension. According to the invention, a suspension is led into a washing column in which at least one filter element is present, so that near the filtering element, a packed bed of particles forms. The bed is disintegrated under the influence of the impulse of a washing liquid, while particles from the bed are incorporated in the washing liquid.

11 Claims, 4 Drawing Sheets

METHOD AND APPARATUS FOR PROCESSING A SUSPENSION

BACKGROUND OF THE INVENTION

1. Field of the Invention

The invention relates to a method for processing a suspension of solid particles in a liquid, such as the effluent of a crystallizer (hereinafter also to be called: crystal slurry) or solid particles suspended in a liquid extraction medium. The invention also relates to apparatus for processing such a suspension.

2. Description of the Related Art

Such a method and apparatus are known from WO-A-98/27240. According to this publication, a suspension consisting of molten metal having solid metal particles therein (unmelted or crystallized) is passed through a washing column in order to separate the relatively pure solid particles from the contaminated liquid fraction (hereinafter also to be called: mother liquor). The washing column contains one or more filters, each of which is included in a separate pipe, which extends in the longitudinal direction through the interior of the washing column, while the suspension is supplied at one extremity of the column and moves along the pipes in the direction of the other extremity of the column. The mother liquor passes the filters and thus ends up in the pipes to be discharged. As via the filters, mother liquor is extracted from the suspension, a porous bed of particles is formed in the column. At the other extremity of the column, means are present for disintegrating or breaking up the bed of particles formed. The removed solid (crystalline) material is melted and a portion of this melt is fed to the particle bed as washing liquid, in order to wash the particles in their own melt. The means for disintegrating or breaking up the crystal bed formed consist of a rotating knife.

A drawback of this known method and apparatus is that the use of a rotating knife, in practice, can entail problems. Melted metals, such as aluminum, are not only hot (the melting point of aluminum is approximately 650° C.) but, moreover, are generally chemically highly reactive (aggressive), in particular with respect to metal objects. For this reason, all parts which are in contact with the liquid metal are to be designed in a material which is resistant to this contact, for instance in ceramics or carbon. This holds in particular for the rotating knife and parts such as bearings. In addition, the rotating knife is to be driven by a motor which is disposed outside the column. The rotating movement is to be transmitted via a shaft which is guided through the column wall. This can entail additional problems with respect to the sealing used which, naturally, must stop the melted material in an adequate manner, without this hindering the rotation of the shaft. All this leads to complicated constructions and to process control which is potentially sensitive to malfunction, for instance in that the rotating knife may become wedged. For processing suspensions based on molten metals, materials such as ceramics or materials based on carbon are prerequisite. Processing these materials into the desired form (for instance into a rotating knife) is a costly matter. Further, the rotating parts require regular maintenance, to which end the process control needs to be halted. With columns of larger diameters, shutting down the apparatus and repair can be a costly matter.

SUMMARY OF THE INVENTION

The object of the present invention is to provide a method and an apparatus for processing a suspension (a mixture of solid particles in a liquid), wherein these problems do not occur, or to a reduced extent. It has been found that this can be achieved by using the kinetic energy or impulse of the washing liquid when removing the solid particles from the packed bed.

Therefore, in a first aspect, the present invention relates to a method for processing a suspension of solid particles in a liquid, wherein the liquid is separated from the solid particles by filtration with the aid of at least one filtering element, while a packed bed of solid particles coming from the suspension forms near the filtering element and wherein a washing front forms which is obtained by introducing a washing liquid into the bed in countercurrent to the solid particles, the bed being subjected to a movement in the direction of the washing front, while a product flow comprising the material of the solid particles is obtained by continuously discharging a portion of the washing liquid, while a part of the packed bed is continuously disintegrated, at least partly under the influence of the impulse of the washing liquid detached, such that solid particles from the bed are incorporated in the washing liquid. According to the invention, what is achieved by transmitting the impulse from the washing liquid to the packed bed is that at a particular level in the column, the bed is disintegrated, that is, under the influence of the impulse of the washing liquid detached, such that solid particles from the bed are incorporated in the washing liquid.

'Suspension' is understood to mean a suspension of solid particles in a liquid, such as for instance a crystal slurry (i.e. a slurry of crystals in a melt or in a saturated solvent) or a liquid flow having solid particles suspended therein which comprise a component to be extracted (for instance seeds, such as calendula seed in an extractant, such as hexane).

The filtering elements allow a packed bed of solid particles to be formed. This packed bed forms near, i.e. around, on, just above of just below the filtering element, depending on the configuration.

The movement of the bed can be effected by, for instance, the hydraulic pressure and/or by using a mechanical auxiliary means such as a screw or a piston.

The invention further relates to an apparatus for processing a suspension, comprising a vessel provided with means for supplying a suspension, at least one filtering element, means for discharging liquid which passes the filtering element, so that a packed bed of solid particles can form near the filtering element, and means for discharging washing liquid in which solid particles from the bed have been incorporated, while means are present for disintegrating or breaking up the packed bed of solid particles with the aid of the impulse of the washing liquid.

The invention can be used for processing a slurry of crystals in a contaminated melt, or for processing a crystal slurry comprising a solvent having crystallized particles therein, such as, for instance, an aqueous, saturated saline solution with salt crystals therein. The invention can also be used for the extraction of particular components from solid particles, such as the extraction of oil from seeds.

If the invention is used for extraction, the starting point is a suspension comprising solid particles with a component to be extracted in a liquid. Preferably, this liquid is the extractant, but this is not required. As washing liquid, in this case, pure extractant is used. A portion of the washing liquid flows against the direction of the moving porous bed to the filters, while the component to be extracted is wholly or partially transferred to the extractant. The extractant with the dissolved component passes the filters and is accordingly obtained as a flow which is enriched in the component to be extracted. The solid particles—with a reduced content of the extracted component—are discharged from the column with the aid of the remainder of the washing liquid. With the aid of a solid/liquid separator (for instance a filter and/or a centrifuge), the particles are separated from the extractant (washing liquid), whereupon, after a flow of fresh extractant is added, the extractant is recirculated as washing liquid. Adding fresh extractant is necessary if the apparatus is operated continuously, in order to compensate the loss of washing liquid (extractant) which, after uptake of the substance to be extracted, has left the column via the filters.

If the suspension comprises crystals in a contaminated melt, the washing liquid is obtained by melting crystals recovered from the washing column. The pure products is then obtained as a discharge flow of the recirculating washing liquid.

If the suspension comprises crystals in a solution, preferably, as washing liquid, a solution is used which is saturated with the (chemical) component the crystals comprise. If desired, here, also, a solid/liquid separator, such as a filter and/or a centrifuge can be used for separating the washed particles from the washing liquid.

In the two latter events (melt and solution) the washing liquid has a higher purity than the crystal slurry. Usually, a pure material has a higher melting temperature or crystallization temperature/crystallization point than an impure liquid.

If the crystals have been obtained by cooling down a contaminated melt, the temperature of the washing liquid is preferably higher than that of the crystal slurry. As the washing liquid is contacted in countercurrent with the colder crystals in the packed bed (the fact is that they have been obtained by cooling down a melt with contaminations, which generally leads to reduction of freezing/solidification point), the washing liquid will crystallize on the surface of the crystals. As a result, the contaminations present between the crystals in the mother liquor are displaced. The grown-on crystals move along with the bed, until they are discharged in that the washing liquid disintegrates the portion of the bed in which the crystals are present. What is achieved in this manner is that, on the one hand, a flow of higher purity can be recovered (coming from the flow of washing liquid) and, on the other hand, a flow of lower purity, which has passed the filtering elements.

In the case where the crystals have not been obtained from a melt by cooling, but, for instance, by evaporation of a solvent, the washing liquid does not crystallize on the crystals. The washing liquid is a saturated solution which—for instance but not exclusively—is obtained by dissolving a portion of the clean crystals in a clean solvent. The washing liquid flows counter to the direction of the moving porous bed to the filters and ends up in the mother liquor.

The impulse of the washing liquid for disintegrating the packed bed can be generated by pumping the washing liquid around and directing it, in a suitable manner, towards the portion of the bed that is to be disintegrated for instance by introducing it tangentially along the inside circumference of the flushing chamber (which is defined by the space in which the particles detached from the packed bed are mixed in the washing liquid) or by using nozzles from which the washing liquid can stream as a powerful jet.

A different possibility for disintegrating the bed is by inductive heating. Inductive heating is a known manner for increasing the temperature of an electrically conductive material by subjecting this to an alternating electromagnetic field. As a result, in the object to be heated, an electrical current is induced and vortices arise, among which eddies (small-scale vortices). Through the dissipation of the electrical and mechanical energy, heat develops. This embodiment is suitable to be used when disintegrating a crystal bed of crystals having electric conductivity, such as metals. When using inductive heating, the disintegration of the packed bed is accelerated in that the particles in the bed, for instance crystals, can then melt.

It is noted that from NL-A-7,904,919, a method an apparatus are known for separating ice crystals from a suspension, whereby a packed bed of ice crystals is formed which is washed in countercurrent with a washing liquid obtained from melted ice crystals. Here, also, the crystal bed is disintegrated with the aid of a scraper. In this publication, it is further noted that the disintegration could also be carried out through melting. However, this is not further elaborated in this publication.

According to the present invention, combinations of pumping around and inductive heating are also possible.

In the broadest of terms, the invention relates to the transfer of solid particles from one liquid to another, for the purpose of washing and/or extracting the particles. The invention can be utilized in all materials which can be physically crystallized, such as organic and inorganic compounds, water included. Also, the invention can be utilized for processing slurries comprising molten contaminated metal having metal crystals therein, in particular when the metal is aluminum, lead, tin or a mixture of lead and tin.

Also, the invention can be used for extracting a compound from solid particles with the aid of a liquid extractant. An example of such a use is the extraction of seeds with the aid of an organic extractant, such as hexane.

Preferably—but not exclusively—the method according to the invention is carried out with one or more filtering elements, preferably of circular cross section, which are arranged vertically and are provided with means for discharging the mother liquor (i.e. the liquid, and generally contaminated portion of the suspension). Discharging the mother liquor can, for instance, be carried out by including the filtering elements in a pipe, at the inside of which pipe the mother liquor is led from the column. Preferably, several filtering elements at an equal mutual distance are used, evenly distributed over the cross section of the column.

Preferably, each of the filtering elements is provided at the top side and/or bottom side with a rod or tube for guiding the bed in the direction mentioned, while each rod or tube has a cross section which is at most equal to the filtering element on which or below which it has been placed.

By continuously supplying the suspension and continuously discharging the mother liquor and the washed particles, it is effected that the packed bed of particles moves in the direction of the washing front. The washing front is located at a height in the column between the filtering elements and the inlet or outlet of the washing liquid. The height of the washing front in the column can be adjusted in a simple manner by selecting the proper pressure at the inlet side of the suspension and/or at the inlet side of the washing liquid. These pressures can be set with (combinations of) means known per se, such as pumps and closing devices. It is also possible, for instance, to increase the pressure at the inlet side of the suspension by including an internal or external recycle flow.

It has been found that it is not possible to provide the washing liquid with a sufficient heat content in order to use it in the known apparatuses and methods (for instance as described in NL-A-7,904,919) such that with this, in an efficient manner, the desired disintegration by melting can take place, because the melting heat of crystals is so high that this would demand an unacceptably high temperature of the washing flow and/or an unacceptably high flow rate of the washing flow. In the known apparatuses, the liquid velocity cannot be controlled such that a disintegration due to impulse transmission of the washing liquid takes place. The embodiment wherein inductive heating is used can be designed such, that it is possible to supply sufficient energy for disintegration of the crystal bed through melting. The embodiment with inductive heating is particularly suitable for materials such as metals which conduct well. Generally, the electrical conduction of most organic and inorganic crystals will be too low for them to be melted by induction, so that this embodiment is less suitable. For the same reason, this embodiment is less suitable for extraction purposes, because the particles generally do not melt then.

Therefore, the invention also relates to an apparatus for processing a suspension, comprising a vessel provided with means for supplying a suspension, at least one filter element, means for discharging liquid passing the filtering element, and means for discharging washing liquid in which solid particles from the bed are incorporated, while means for inductive heating of washing liquid present in the vessel are present, which means for inductive heating are disposed such, that the washing liquid can disintegrate a portion of the packed bed of solid particles forming near the filtering element. The crystals which have been detached from the packed bed will be transported to the flushing chamber and, under the influence of the inductive heating, be melted.

BRIEF DESCRIPTION OF THE DRAWING FIGS.

Figure 5:
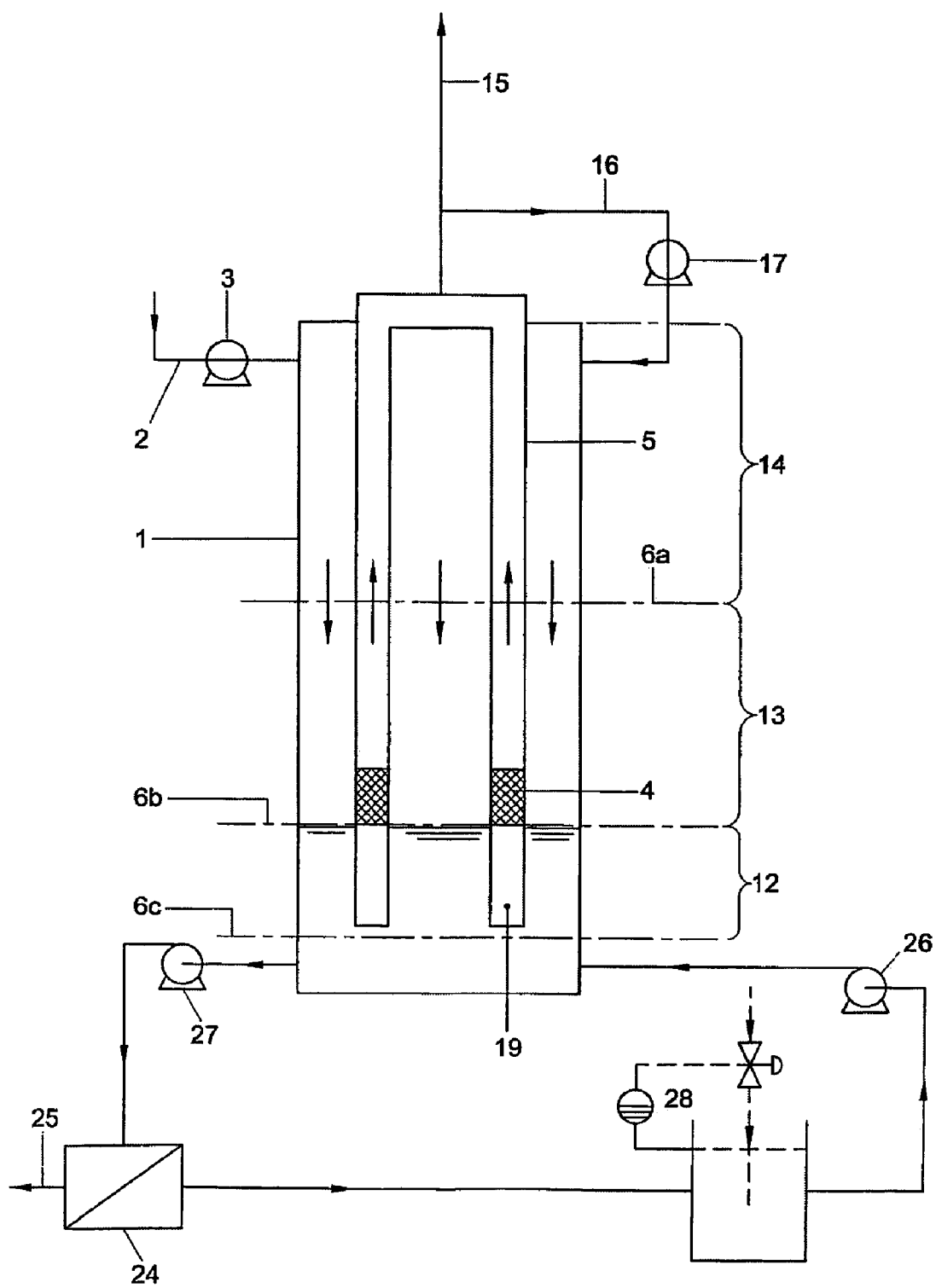

FIG. 5 schematically shows an apparatus which can be used for processing particles in a saturated solution.

DETAILED DESCRIPTION OF THE PREFERRED EMBODIMENTS

Figure 1:
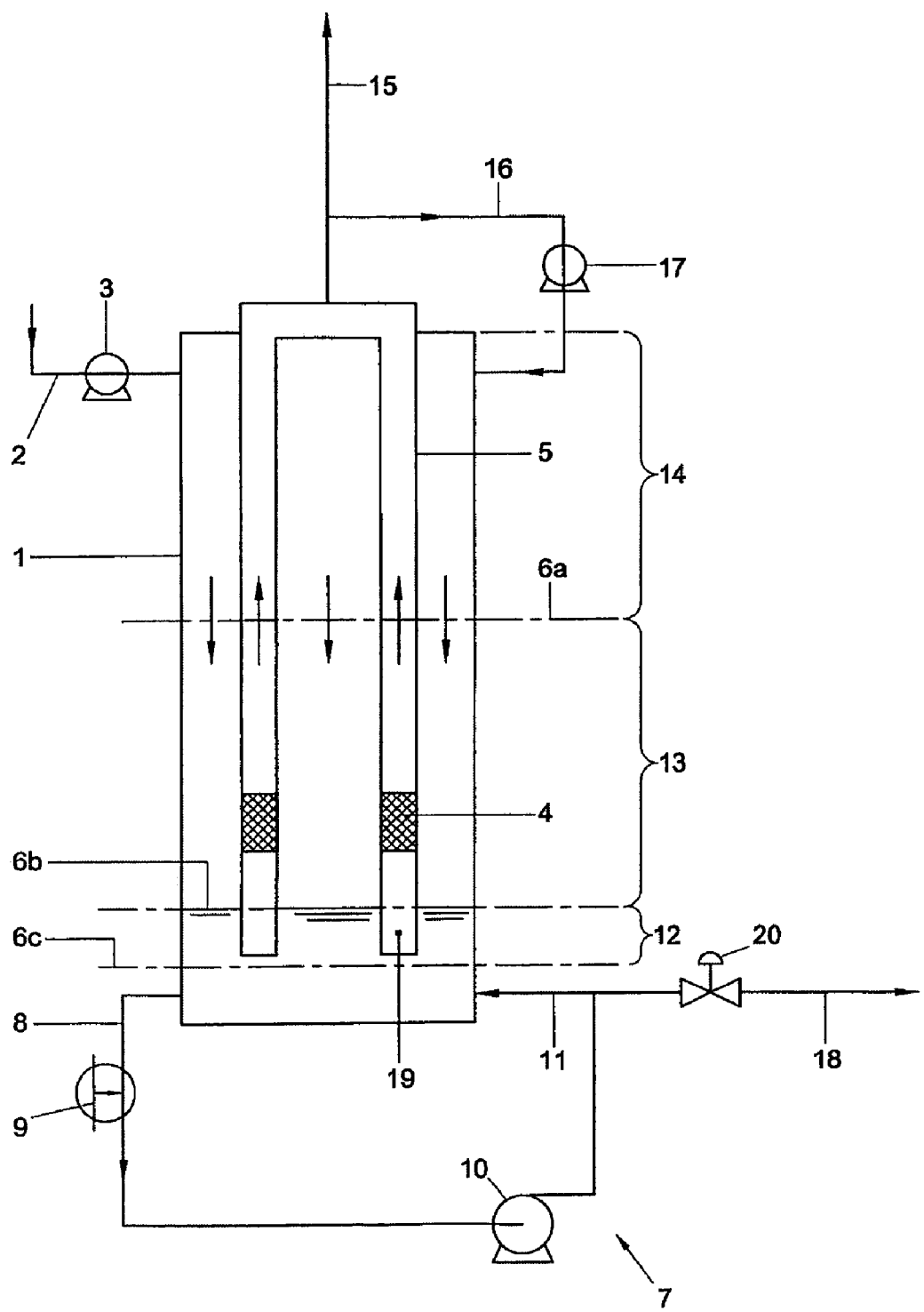
FIG. 1 shows a schematic cross section of an example of an apparatus according to the present invention.

FIG. 1 represents a schematic cross section of an example of an apparatus according to the invention. It comprises a vessel (1) provided with means for supplying a suspension which, according to this example, comprise a supply pipe (2) and a pump (3). The apparatus further comprises at least one filtering element (4), means (5) for discharging liquid which passes the filtering element, so that a packed bed of solid particles can form around the filtering element. According to the Figure, the top side of the bed is located on line (6*a*). The washing front is located on line (6*b*) and the bottom side of the packed bed is located on line (6*c*). Further, means (7) are present for disintegrating or breaking up the packed bed. In the example of FIG. 1, these means for disintegrating comprise a recirculation circuit in which washing liquid having therein solid particles incorporated from the bed is discharged from the column at point (8) and is supplied at (11). In this circuit, the drained washing liquid is heated by means of heat exchanger (9) ("melter") and the impulse is provided to the washing liquid by pump (10).

According to the embodiment in FIG. 1, via the supply pipe (2), a suspension is continuously pumped into the washing column. A bed forms between (6*a*) and (6*c*) around the filtering elements (4), in that the mother liquor leaves the column via the filters and the filter pipes (5) (in upward direction in the embodiment of FIG. 1, as represented by arrows pointing upwards). In the embodiment of FIG. 1, the bed shifts in the direction of the washing front, where the disintegration of the bed takes place at the bottom side of the column, represented by arrows pointing downwards. The filtering elements (4) are lengthened at the bottom side with a tube (19) for guiding the packed bed in the direction mentioned.

In this manner, in the column, a washing zone (12) is formed between (6*b*) and (6*c*) and a concentration zone (13) between (6*a*) and (6*b*). At (14), the suspension zone is located, in which zone the concentration of particles is at most equal to that of the supplied suspension, which suspension, if desired, is diluted in this zone by the recirculation of filtrate via pipe (16) and pump (17).

The mother liquor is discharged via discharge pipe (15). Optionally, at (16), a portion of the mother liquor can be recirculated with the aid of pump (17), in order to set the desired pressure in the column. The washing liquid, consisting of the melted pure particles coming from the bed, is discharged via drain (18). Control valve (20) is used for setting the proper pressure at the bottom side of the washing front, and determines the size of the drain flow (18).

Figure 2:
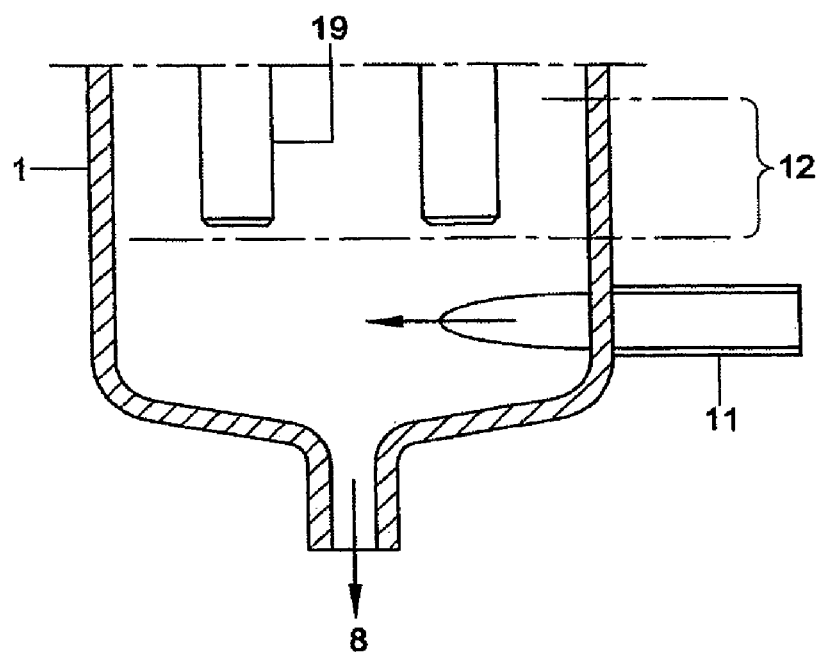
FIG. 2 shows details of a cross section of a bottom side of a column according to a preferred embodiment of the invention.
Figure 4:
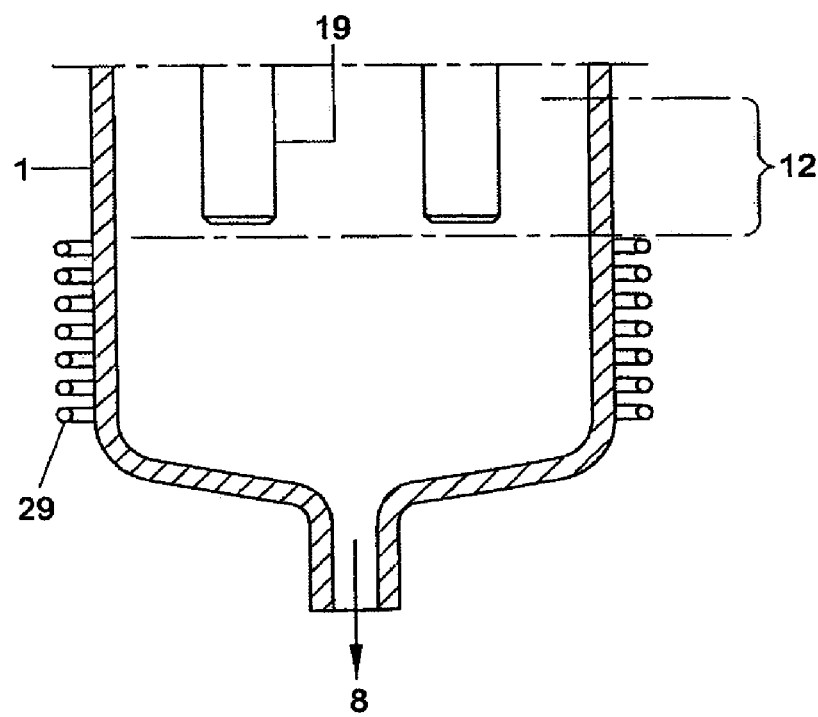
FIG. 4 shows details of a cross section of a bottom side of a column according to a preferred embodiment of the present invention.
Figure 3:
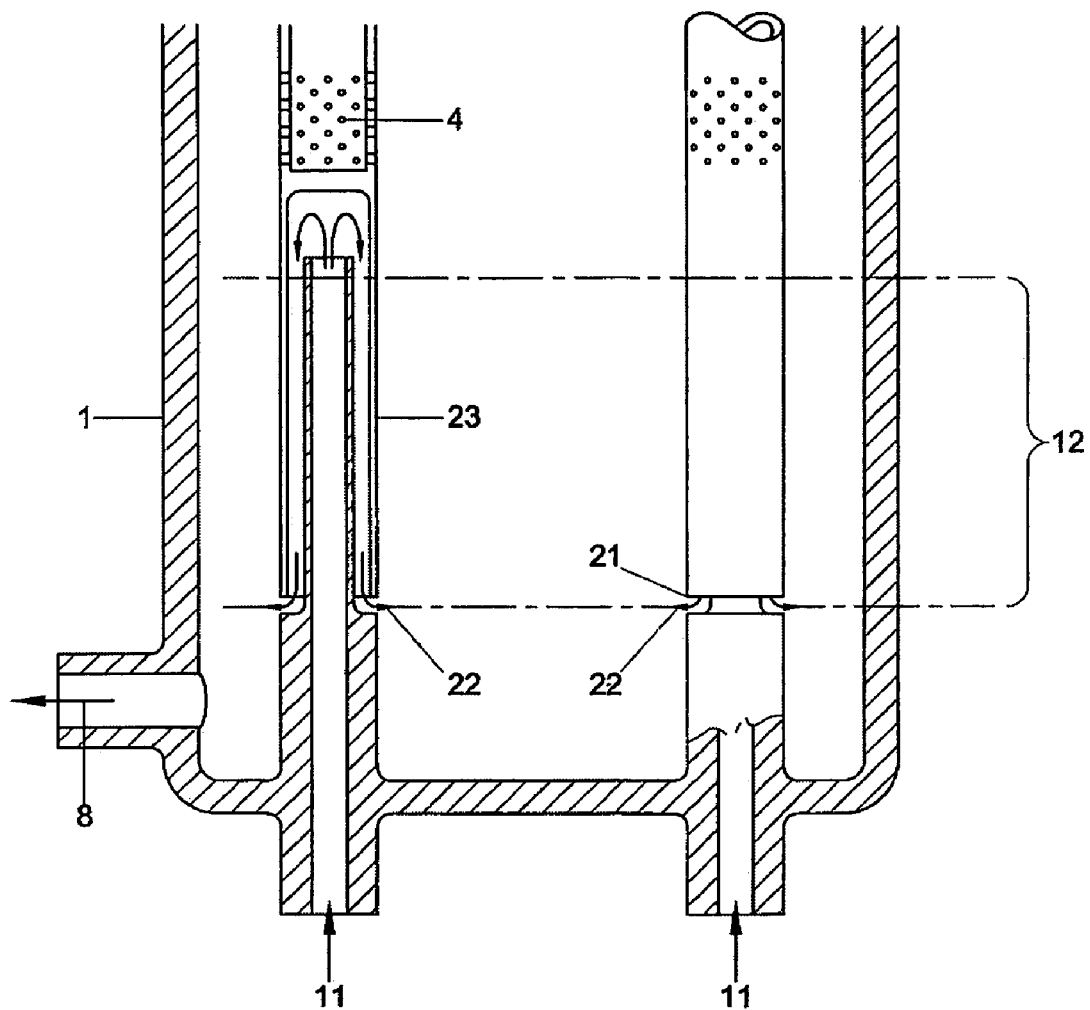
FIG. 3 shows details of a cross section of a bottom side of a column according to a preferred embodiment of the present invention.

FIGS. 2, 3 and 4 represent details of a cross section of the bottom side of a column and represent three preferred embodiments.

According to the preferred embodiment schematically represented in FIG. 2, the washing liquid is introduced tangentially into the column below the level (6*c*). The discharge point (8) for the washing liquid is, for instance, located at the bottom side of the column.

Apart from tangentially, the washing liquid can also be introduced radially. More points of introduction are also possible.

FIG. 3 describes a preferred embodiment wherein the washing liquid is supplied via the guiding elements (23), which guiding elements, according to this embodiment, are of hollow design. The guiding elements are designed such that the washing liquid follows the path indicated by arrows in the Figure. What is consequently achieved is that the washing liquid, prior to flowing into the flushing chamber, is first in heat exchanging contact with the inside of element (23). As a result, this element will heat up on the outside, so that particles are prevented from freezing to the outer surface of element (23). The washing liquid leaves the hollow elements (23) via a slit or different outflow opening (21) in order to form jets (22), as represented by the arrows. The jets can leave the outflow openings, for instance in the direction perpendicular to the central axis of the guiding elements (19), so that, as it were, a cutting effect of the washing liquid is obtained along the circumference of the guiding elements. This embodiment has as an advantage that it can be upscaled properly, i.e. that the performance on a larger scale can be predicted on the basis of findings on a smaller scale. When, in upscaling, the diameter and hence the surface of the column cross section is increased, while the number of pipes (23) per surface unit is kept constant, in principle, a linear upscaling can be obtained.

FIG. 4 schematically represents a preferred embodiment wherein the disintegration of the packed bed takes place by means of local inductive heating. To this end, an induction spiral (29) is provided at the bottom side of the column. The drain (8) for the washing liquid is for instance located on the bottom side of the column. As, in this manner, sufficient impulse and/or heat can be supplied, a washing liquid recirculation circuit is not necessary.

Apart from washing particles in their own melt, the method and the washing column according to the invention can also very suitably be used for washing particles, not by melting but by dissolving these particles. An example of such a use involves the water-soluble salts NaCl and KCl. The crystals are not melted but dissolved.

FIG. 5 schematically represents, by way of example, an apparatus which can be very suitably used for processing particles in a saturated solution. In this Figure, (24) indicates a solid/liquid separator, for instance a centrifuge; (25) indicates the drain of washed solid matter; (26) a supply pump for the disintegration liquid; (27) a discharge pump for washed slurry; and (28) a control for replenishing washing liquid.

The operation of this embodiment is as follows. The flow rate of pump (26) is slightly larger than the amount of liquid which is discharged with pump (27). The difference is the washing liquid used. This washing liquid is discharged via filter (4) and is replenished at (28).

EXAMPLE

Influence of the Manner of Disintegration of the Crystal Bed on the Performances of a Hydraulic Washing Column The performances were compared of a hydraulic washing column with and without scraper knife for the separation and purification of a comparable feed (ca. 25%-suspension of paraxylene crystals in a contaminated melt). In the washing column without the scraper knife, use was made of the kinetic impulse of the washing liquid for disintegrating the bed. The washing columns were identical apart from the presence, or absence, of the scraper knife. The washing column has an internal diameter of 8 cm, a total length of ca. 1 meter and contained one filter pipe having an outside diameter of ca. 2.5 cm. The porous filter was located ca. 30 cm above the location where the crystal bed was disintegrated, either by the scraper knife or by the kinetic impulse of the washing liquid.

TABLE

Performances of a hydraulic washing column without and with scraper knife in separating paraxylene crystals from a contaminated melt.

| Washing column | production capacity ($dm^3/h$) | temperature (° C.) | feed pressure (bar) | washing pressure (bar) | capacity ($dm^3/m^2/h$) | capacity ($kg/m^2/h$) |
|---|---|---|---|---|---|---|
| without scraper | 75 | 5.5 | 2 | 1.2 | 14 921 | 13 151 |
| with scraper | 28.2 | 3.95 | 2.4 | 1 | 5 602 | 4 945 |

In the Table, the temperature is that of the crystal suspension (feed of the washing column). The values of production capacity ($dm^3/h$), temperature, feed pressure and washing pressure are experimentally measured values. In the last two columns, the production capacity of the washing column is based on the surface of the cross section of the washing column. Under comparable conditions, the washing column without scraper knife proves to have a capacity approximately 2.7 times larger than the washing column with scraper knife.

The invention claimed is:

1. A method for processing a suspension of solid particles in a liquid, comprising:

separating the liquid from the solid particles by filtration with aid of at least one filtering element, while a packed bed of solid particles coming from the suspension forms near said filtering element;

forming a washing front which is obtained by bringing a washing liquid countercurrent to the solid particles in the bed, the bed being subjected to a movement in a direction of said washing front; and obtaining a product stream comprising a material of said solid particles by continuously discharging a portion of said washing liquid, wherein a portion of said packed bed is continuously disintegrated, at least partly under an influence of an impulse of the washing liquid detached, such that solid particles from the bed are incorporated in the washing liquid.

2. A method according to claim 1, wherein said disintegration of a portion of the packed bed is carried out with aid of a stream or jet.

3. A method according to claim 1, wherein the impulse of the washing liquid is furnished by pumping around and/or inductively heating the washing liquid.

4. A method according to claim 1, wherein said solid particles comprise a component to be extracted and wherein an extractant stream enriched in the component to be extracted and which passes the filtering element is obtained.

5. A method according to claim 1, wherein the suspension comprises molten metal.

6. A method according to claim 5, wherein the metal is one of aluminum, lead, tin or a mixture of lead and tin.

7. A method according to claim 1, wherein the filtration is carried out with one or more cylindrical filtering elements, whose casing forms a filtering surface, which are arranged vertically and are provided with means for discharging the liquid.

8. A method according to claim 7, wherein several filtering elements are used, which are arranged at an equal mutual distance and which are evenly distributed over the cross section of the column.

9. A method according to claim 7, wherein each of the filtering elements is provided at the top side and/or at the bottom side with a rod or tube for guiding said bed in said direction, while each rod or tube has a cross section which is equal to the filtering element on which or below which it has been placed.

10. A method according claim 1, wherein the suspension is supplied at an increased pressure.

11. A method according to claim 2, wherein the stream or jet is tangentially introduced.

* * * * *